United States Patent
Chen et al.

(10) Patent No.: US 7,576,522 B2
(45) Date of Patent: Aug. 18, 2009

(54) CIRCUIT AND METHOD FOR SOFT START OF A SWITCHING REGULATOR FROM A RESIDUAL VOLTAGE

(75) Inventors: Isaac Y. Chen, Jubei (TW); Chien-Fu Tang, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 0 days.

(21) Appl. No.: 12/076,798

(22) Filed: Mar. 24, 2008

(65) Prior Publication Data
US 2008/0238397 A1    Oct. 2, 2008

(30) Foreign Application Priority Data
Mar. 26, 2007    (TW)    ............... 96110413 A

(51) Int. Cl.
G05F 1/59    (2006.01)
(52) U.S. Cl. .................. 323/271; 323/284; 323/901
(58) Field of Classification Search .............. 363/271, 363/282, 284, 901; 323/271, 282, 284, 901
See application file for complete search history.

(56) References Cited

U.S. PATENT DOCUMENTS

| | | | |
|---|---|---|---|
| 6,765,371 B2 * | 7/2004 | Kataoka | 323/222 |
| 2004/0022078 A1 * | 2/2004 | Shieh | 363/49 |
| 2007/0064454 A1 * | 3/2007 | Chen et al. | 363/49 |
| 2008/0238397 A1 * | 10/2008 | Chen et al. | 323/288 |

* cited by examiner

Primary Examiner—Jeffrey L Sterrett
(74) Attorney, Agent, or Firm—Rosenberg, Klein & Lee

(57) ABSTRACT

For soft start of a switching regulator, the output voltage of the switching regulator is fed back to be compared with a ramp signal, in order to trigger a comparison signal when the ramp signal rises up to reach the feedback signal, to enable the switching regulator such that the output voltage changes from a residual voltage toward a target value. The low side switch of the switching regulator is kept off for a period of time after the switching regulator is enabled, so as to prevent a reverse current during the soft start period.

10 Claims, 5 Drawing Sheets

CIRCUIT AND METHOD FOR SOFT START OF A SWITCHING REGULATOR FROM A RESIDUAL VOLTAGE

FIELD OF THE INVENTION

The present invention is related generally to a circuit and method for soft start of a switching regulator and, more particularly, to a circuit and method for soft start of a switching regulator from a residual voltage.

BACKGROUND OF THE INVENTION

In many systems, soft start function is provided for monotonic start-up of the systems, to reduce the impact to the systems during the start-up and thereby avoid overload to some elements thereof and over voltage of the systems. For further detailed information about soft start, readers may refer to U.S. Pat. No. 6,552,517 to Ribellino et al. In conventional soft start methods, the system always starts up from a zero voltage. However, there may be some electric charges remaining on the output terminal of the system after the last operation of the system, which makes the output voltage of the system not be zero at the beginning of the next start-up. Conventionally, the soft start of a system always releases the remaining electric charges on the output terminal of the system in advance and then charges it again, which wastes those remaining electric charges. For not wasting the remaining electric charges, U.S. Pat. No. 6,841,977 to Huang et al. provides a soft start circuit to keep the low side switch off until the output voltage reaches a target value, so as to remain the residual voltage on the output. However, this soft start circuit can be only used in a buck pulse width modulation (PWM) circuit. U.S. Pat. Publication No. 2004/0228152 to Solie provides a soft start circuit to charge a soft start capacitor by the residual voltage on the output of a voltage converter before enabling the voltage regulation, which will have the voltage on the soft start capacitor equal to that on the output due to charge sharing. When enabling the voltage conversion, the voltage on the soft start capacitor is used as a reference voltage to be compared with the voltage on the output terminal, so there is no need to release the residual voltage on the output terminal. However, this soft start circuit needs an extra capacitor as the soft start capacitor, and the sawtooth wave at beginning to be compared with the output voltage has a RC discharge curve, which is disadvantageous to the performance of the soft start.

FIG. 1 shows a synchronous switching regulator 100 with a soft start function, and FIG. 2 is a waveform diagram showing the signals in the circuit of FIG. 1. Referring to FIGS. 1 and 2, waveform 200 represents the output voltage Vo of the synchronous switching regulator 100, waveform 202 represents the ramp signal SS_Ramp for soft start function, waveform 204 represents the feedback signal VFB, waveform 206 represents the enable signal EN for the error amplifier 104, waveform 208 represents the enable signal Real_EN for the PWM controller 106, waveform 210 represents the high side signal Source_CTL, waveform 212 represents the low side signal Sink_CTL, and waveform 214 represents the inductor current IL. In the synchronous switching regulator 100, the high side switch 108 and the low side switch 110 are serially connected between the power input Vin and ground GND, to be switched to produce the output voltage Vo and the inductor current IL to supply for two loads 112 and 114, and the sample circuit 116 samples the output voltage Vo to produce the feedback voltage VFB into the inverting input of the error amplifier 104. At time t1, the enable signal EN changes to high as shown by the waveform 206 to enable the error amplifier 104, the synchronous switching regulator 100 enters a soft start mode, and the multiplexer 102 switches the ramp signal SS_Ramp to the non-inverting input of the error amplifier 104. If there is a residual voltage on the output terminal Vo, the feedback signal VFB will not be zero from the beginning, so the ramp signal SS_Ramp at beginning will be lower than the feedback VFB, as shown by the waveforms 202 and 204 in FIG. 2. In this condition, the PWM controller 106 will not be enabled, in order to keep the residual voltage on the output terminal Vo. At time t2, the ramp signal SS_Ramp rises higher than the feedback signal VFB, thereby making the error amplifier 104 trigger the enable signal Real_EN to enable the PWM controller 106, the enabled PWM controller 106 produces the PWM signals Source_CTL and Sink_CTL according to the error signal S1 provided by the error amplifier 104 to switch the switches 108 and 110 respectively, and thus the output voltage Vo will rise up from the residual voltage on the output terminal. After the soft start finishes, the multiplexer 102 switches the non-inverting input of the error amplifier 104 to receive a reference voltage Vr. However, at time t2, the error signal S1 just begins to rise up, so the duty cycle of the high side signal Source_CTL is small, and the duty cycle of the signal Sink_CTL is large, as shown by the waveforms 210 and 212 in FIG. 2, which causes a reverse current IL, as shown by the waveform 214 between time t3 and time t4, and further makes the output voltage Vo to decrease, causing energy loss, as shown by the waveform 200 between time t3 and time t4 in FIG. 2.

Therefore, it is desired a circuit and method for soft start of a switching regulator from a residual voltage and prevention of a reverse current during the soft start period.

SUMMARY OF THE INVENTION

An object of the present invention is to provide a circuit and method for soft start of a switching regulator form a residual voltage. Specifically, the inventive circuit and method may prevent a reverse current during the soft start period, and is suitable for all types of switching regulators.

According to the present invention, a circuit and method for soft start of a switching regulator from a residual voltage compare a feedback signal proportional to the output voltage of the switching regulator with a ramp signal for soft start function, to trigger a comparison signal for a first controller to enable the switching regulator when the ramp signal rises up to reach the feedback signal, such that the output voltage changes from the residual voltage toward a target value, and keep the low side switch off by a second controller for a period of time after the switching regulator is enabled, so as to prevent a reverse current.

BRIEF DESCRIPTION OF DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
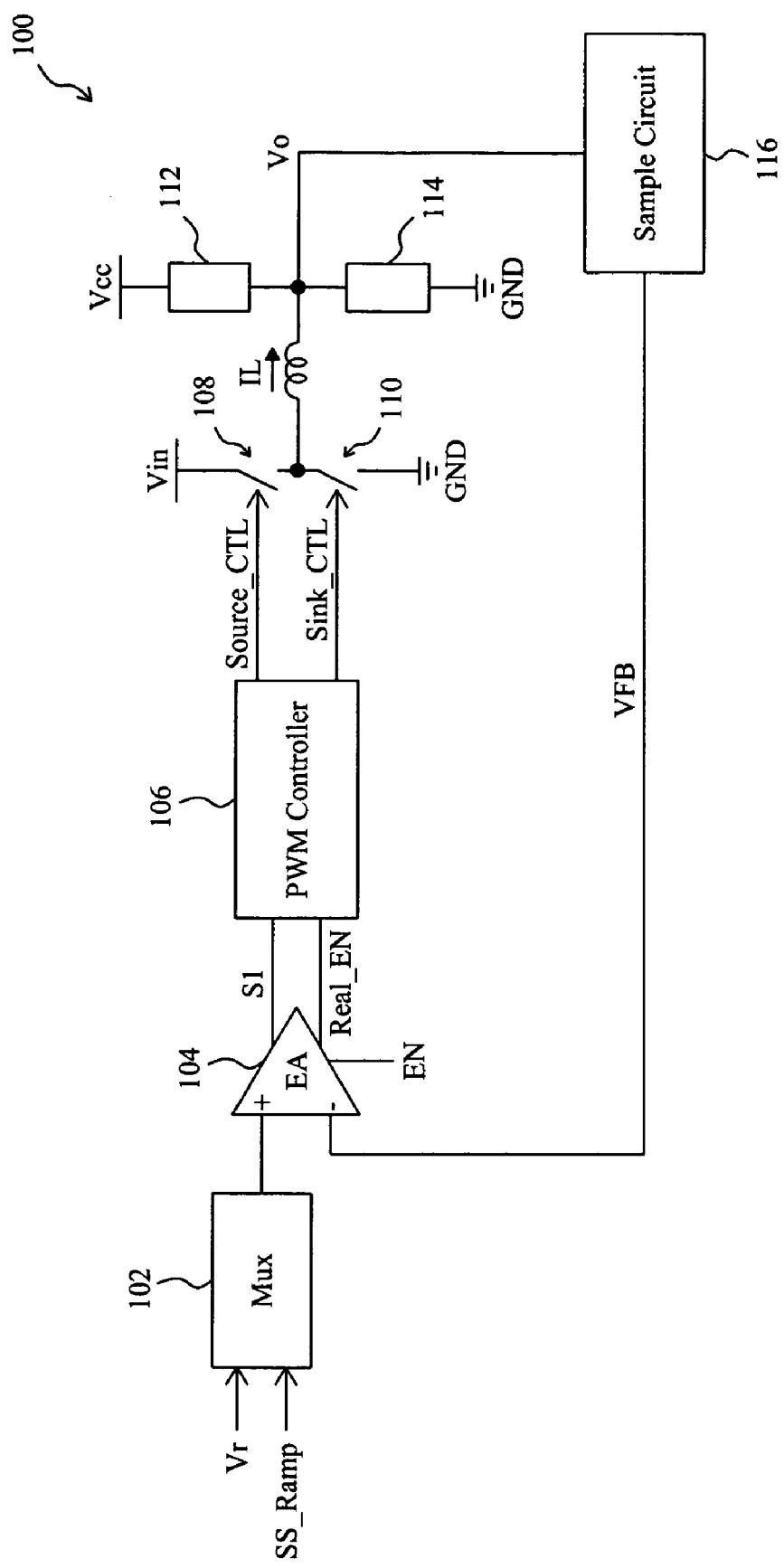
FIG. 1 shows a conventional synchronous switching regulator with a soft start function.
Figure 2:
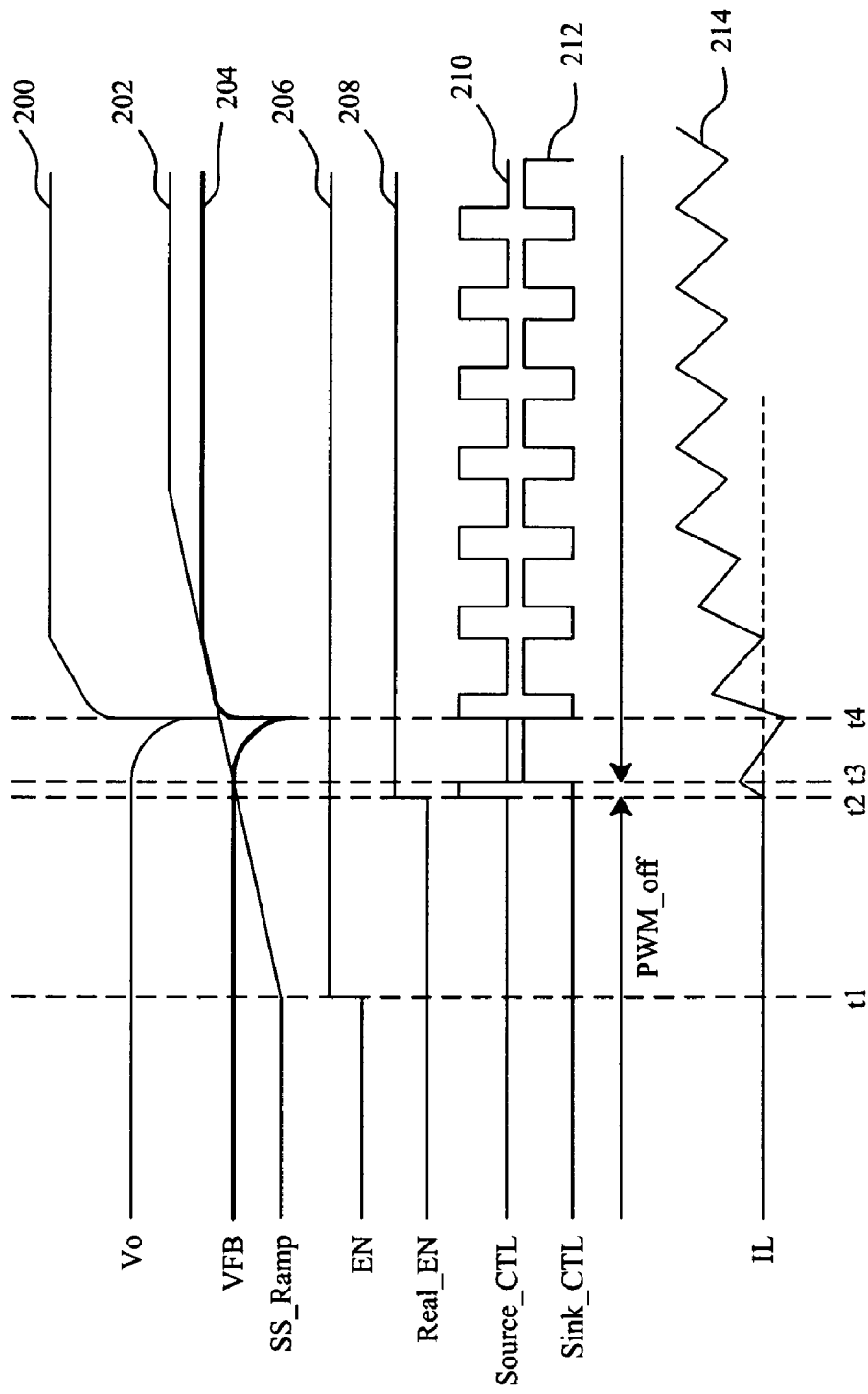
FIG. 2 is a waveform diagram showing the signals in the circuit of FIG. 1.
Figure 3:
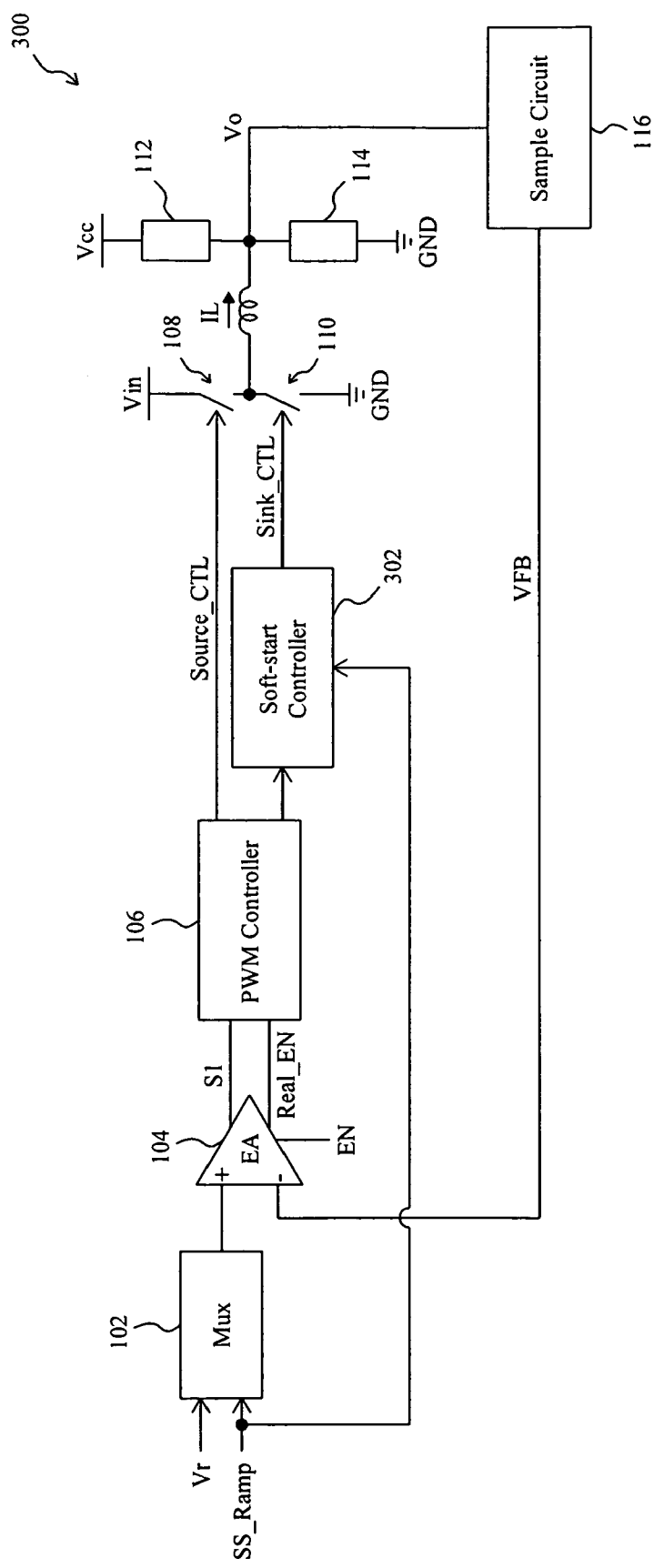
FIG. 3 shows a first embodiment according to the present invention.
Figure 4:
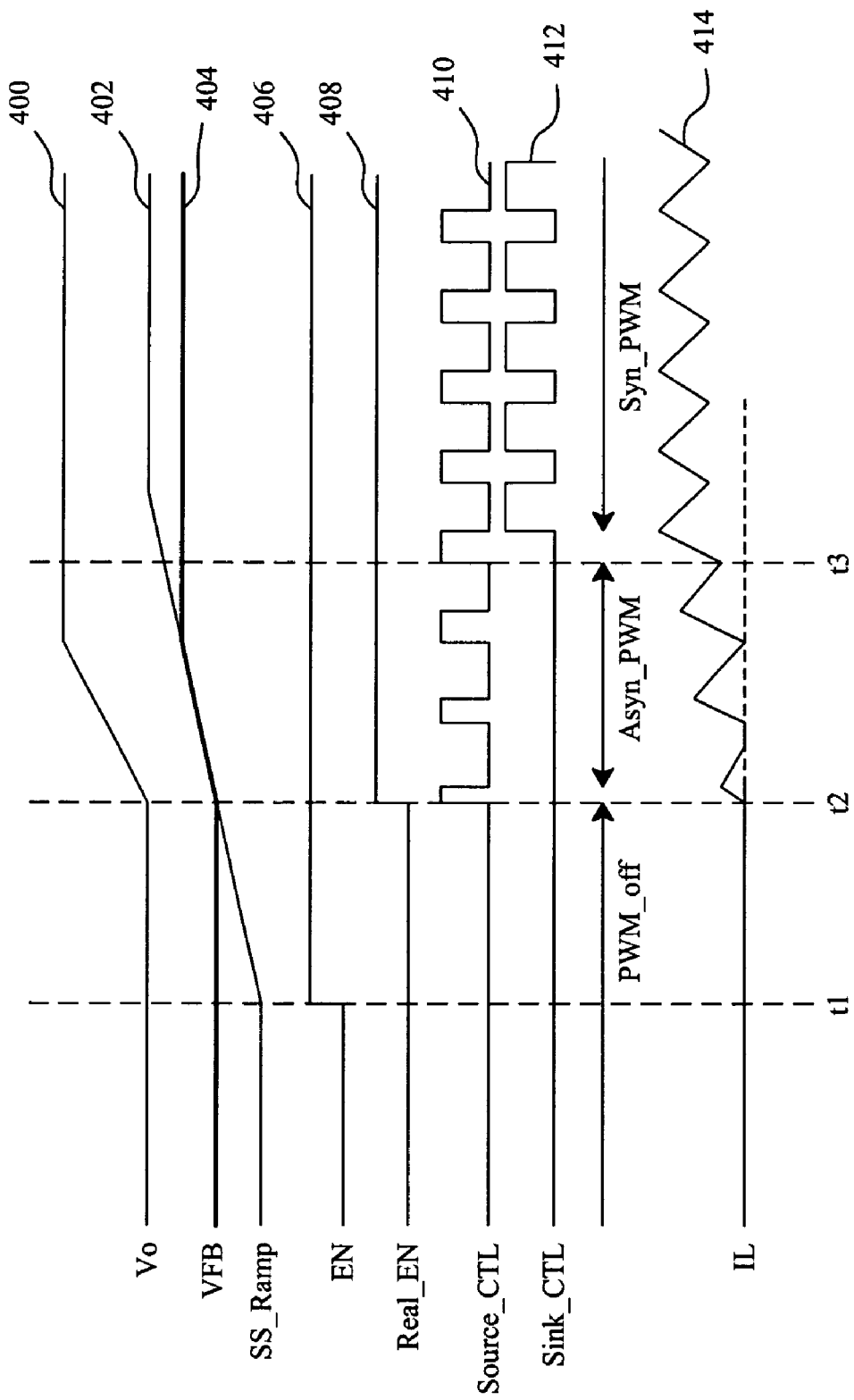
FIG. 4 is a waveform diagram showing the signals in the circuit FIG. 4.

FIG. 3 shows a first embodiment according to the present invention, and FIG. 4 is a waveform diagram showing the signals in the circuit of FIG. 3. Referring to FIGS. 3 and 4, waveform 400 represents the output voltage Vo of the synchronous switching regulator 300, waveform 402 represents the ramp signal SS_Ramp for soft start of the synchronous switching regulator 300, waveform 404 represents the feedback signal VFB, waveform 406 represents the enable signal EN for the error amplifier 104, waveform 408 represents the enable signal Real_EN for the PWM controller 106, waveform 410 represents the high side signal Source_CTL, waveform 412 represents the low side signal Sink_CTL, and waveform 414 represents the inductor current IL. In the synchronous switching regulator 300, the high side switch 108 and the low side switch 110 are connected between the power input Vin and ground GND, to be switched to produce the output voltage Vo and the inductor current IL to supply for two loads 112 and 114, the sample circuit 116 samples the output voltage Vo to produce the feedback voltage VFB into the inverting input of the error amplifier 104, and the multiplexer 102 switches the reference voltage Vr and the ramp signal SS_Ramp to the non-inverting input of the error amplifier 104. At time t1, the synchronous switching regulator 300 starts up and enters a soft start mode first, the enable signal EN changes to high to enable the error amplifier 104, and the multiplexer 102 connects the ramp signal SS_Ramp to the non-inverting input of the error amplifier 104. Due to the residual voltage on the output terminal Vo, the feedback signal VFB is higher than the ramp signal SS_Ramp at beginning, as shown by the waveforms 402 and 404 in FIG. 4. In this condition, the PWM controller 106 will not be enabled in order to remain the residual voltage on the output terminal Vo until the ramp signal SS_Ramp rises higher than the feedback signal VFB, as shown at time t2. In response to the ramp signal SS_Ramp becoming higher than the feedback signal VFB, the error amplifier 104 triggers the enable signal Real_EN to enable the PWM controller 106 such that the output voltage Vo starts to rise up from the residual voltage on the output terminal Vo. The enabled PWM controller 106 produces the PWM signals Source_CTL and Sink_CTL to switch the switches 108 and 110. For prevention of a reverse current IL at this soft start period, a soft start controller 302 will block the low-side signal Sink_CTL provided by the PWM controller 106 to keep the low side switch 110 off for a period of time, such that during this period of time the synchronous switching regulator 300 operates in an asynchronous mode. Since the low side switch 110 remains off, the inductor current IL will never become reverse to flow from the output terminal Vo through the low side switch 110 to ground GND, as shown by the waveform 414 in FIG. 4, and therefore the output voltage Vo will not decrease due to such release of electric charges. By monitoring the ramp signal SS_Ramp, the soft start controller 302 determines when to release the low side signal Sink_CTL. For example, when the soft start finishes, or when the ramp signal SS_Ramp rises up to reach a predetermined value, the soft start controller 302 will release the low side signal Sink_CTL, and thereafter, as shown at time t3 in FIG. 4, the synchronous switching regulator 300 enters a synchronous mode in which the high side switch 108 and low side switch 110 are synchronously and complementarily switched.

Figure 5:
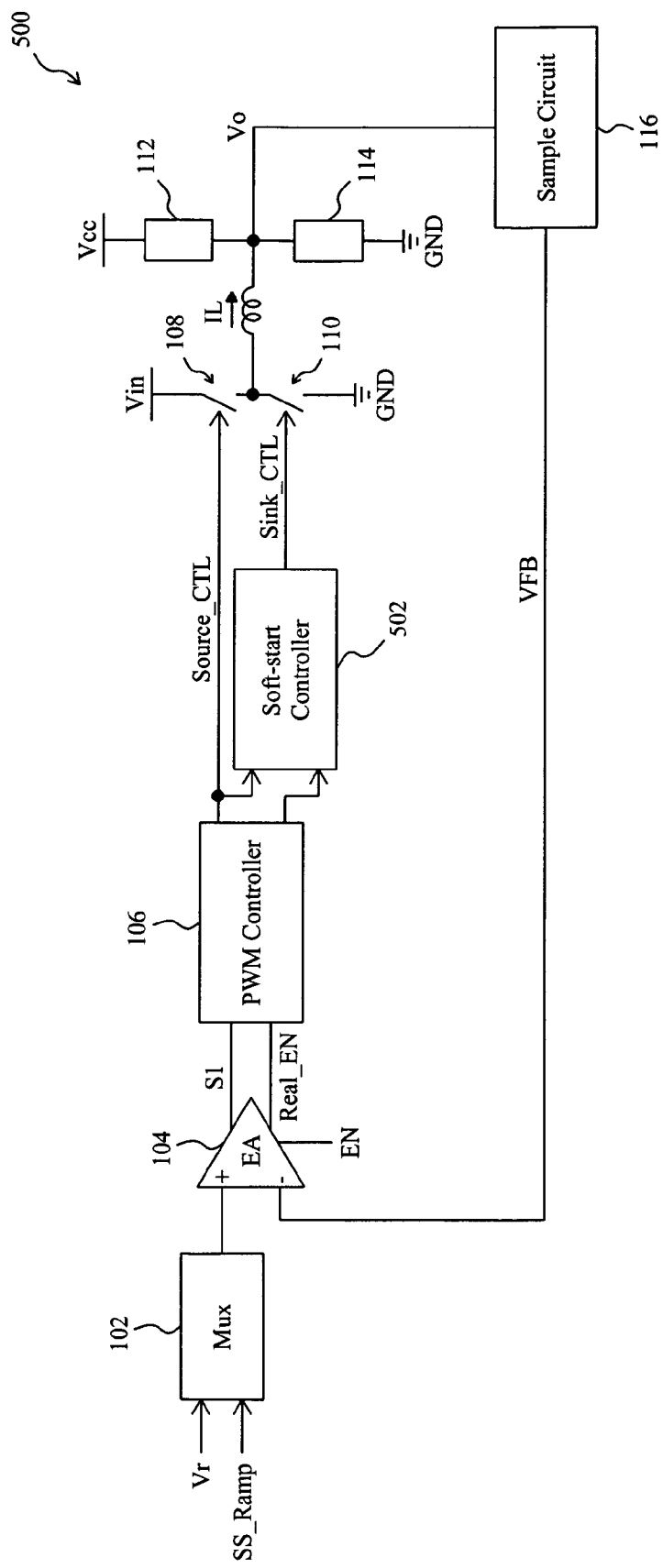
FIG. 5 shows a second embodiment according to the present invention.

FIG. 5 shows a second embodiment according to the present invention, with the same waveform diagram shown in FIG. 4. In this synchronous switching regulator 500, the operation is the same as that of the synchronous switching regulator 300 of FIG. 3, except that the high side signal Source_CTL is also connected to a soft start controller 502, and the soft start controller 502 counts the number of switching times of the high side switch 108 by monitoring the high side signal Source_CTL, in order to determine when to stop blocking the low side signal Sink_CTL. As did by the soft start controller 302 in the synchronous switching regulator 300 of FIG. 3, the soft start controller 502 also blocks the low side signal Sink_CTL for a period of time after the synchronous switching regulator 500 is enabled, such that the synchronous switching regulator 500 operates in an asynchronous mode during this period of time. When the number of switching times of the high side switch 108 during the soft start period is counted to reach a predetermined value, for example four times, the soft start controller 502 will release the low side signal Sink_CTL, such that the synchronous switching regulator 500 switches to a synchronous mode, and the high side switch 108 and the low side switch 110 are synchronously and complementarily switched to produce the output voltage Vo.

Although the above embodiments are designed with specific buck voltage converter for illustration of the principle of the present invention, the inventive circuit and method are indeed suitable for soft start of all types of voltage converters, such as DC/DC converters, synchronous buck PWM converters, synchronous boost PWM converters, synchronous buck-boost PWM converters, forward converters, Cuk converters, single end primary inductor circuits (SEPIC), and other types of systems.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A circuit for soft start of a switching regulator having a high side switch and a low side switch to be switched to convert an input voltage to an output voltage, comprising:
   a comparator for comparing a feedback signal proportional to the output voltage at an output terminal with a ramp signal to thereby produce a comparison signal;
   a first controller for enabling the switching regulator according to the comparison signal, such that the output voltage changes from a residual voltage toward a target value, the first controller selectively inhibiting the switching regulator prior to the ramp signal reaching the feedback signal in value; and
   a second controller for selectively keeping the low side switch off for a period of time after the switching regulator is enabled by the first controller to prevent a reverse current condition at the output terminal.

2. The circuit of claim 1, wherein the high side switch and the low side switch are synchronously and complementary switched after the period of time.

3. The circuit of claim 1, wherein the period of time is so long that the ramp signal rises up to reach a predetermined value.

4. The circuit of claim 1, wherein the period of time is so long that the high side switch is switched with a predetermined number of switching times.

5. The circuit of claim 1, further comprising a sample circuit for sampling the output voltage to produce the feedback signal.

6. The circuit of claim 1, further comprising a multiplexer for switching the ramp signal to the comparator.

7. A method for soft start of a switching regulator having a high side switch and a low side switch to be switched to convert an input voltage to an output voltage, comprising the steps of:
- (a) comparing a feedback signal proportional to the output voltage at an output terminal with a ramp signal;
- (b) when the ramp signal rises up to reach the feedback signal, enabling the switching regulator to enter an asynchronous mode such that the output voltage changes from a residual voltage toward a target value, the switching regulator being selectively inhibited prior to the ramp signal reaching the feedback signal in value, the low side switch being selectively kept off for a period of time in the asynchronous mode to prevent a reverse current condition at the output terminal; and
- (c) switching the switching regulator to a synchronous mode after the period of time, wherein the high side switch and the low side switch are synchronously and complementarily switched in the synchronous mode.

8. The method of claim 7, wherein the step (c) comprises the step of monitoring the ramp signal and the period of time is so long that the ramp signal rises up to reach a predetermined value.

9. The method of claim 7, wherein the step (c) comprises the step of counting a number of switching times of the high side switch and the period of time is so long that the number of switching times reaches to a predetermined value.

10. The method of claim 7, further comprising the step of sampling the output voltage for producing the feedback signal.

* * * * *